United States Patent
Kamei

[11] Patent Number: 5,716,573
[45] Date of Patent: Feb. 10, 1998

[54] METHOD FOR SURFACE TREATMENT OF WEATHER STRIP

[75] Inventor: Yasunori Kamei, Hiroshima, Japan

[73] Assignee: Nishikawa Rubber Co., Ltd., Hiroshima, Japan

[21] Appl. No.: 668,514

[22] Filed: Jun. 28, 1996

[30] Foreign Application Priority Data

Aug. 7, 1995 [JP] Japan .................. 7-222689

[51] Int. Cl.$^6$ ..................... B29C 47/02
[52] U.S. Cl. .............. 264/171.13; 156/106; 156/244.11; 264/171.17; 264/173.17; 264/177.17; 264/177.19; 264/252; 264/284
[58] Field of Search ............... 264/173.17, 177.17, 264/177.19, 252, 284; 425/462, 131.1; 156/244.11, 107–109

[56] References Cited

U.S. PATENT DOCUMENTS

| | | | |
|---|---|---|---|
| 4,359,439 | 11/1982 | Fritsch et al. | 425/325 |
| 4,511,526 | 4/1985 | Yamaguchi | 264/177.17 |
| 4,849,045 | 7/1989 | Schmidt | 156/244.24 |
| 5,137,675 | 8/1992 | Rabe | 264/173.17 |
| 5,143,772 | 9/1992 | Iwasa | 264/45.9 |
| 5,183,613 | 2/1993 | Edwards | 425/462 |
| 5,343,655 | 9/1994 | Miyakawa et al. | 264/177.2 |
| 5,424,019 | 6/1995 | Miyakawa et al. | 264/177.17 |
| 5,441,685 | 8/1995 | Miyakawa et al. | 264/177.19 |
| 5,447,671 | 9/1995 | Kato et al. | 264/177.19 |

FOREIGN PATENT DOCUMENTS

| | | | |
|---|---|---|---|
| 2580285 | 10/1986 | France | 264/173.17 |
| 58-112716 | 7/1983 | Japan | 264/173.17 |
| 5-31785 | 2/1993 | Japan | 264/173.17 |
| 6-72155 | 3/1994 | Japan . | |
| 7-119046 | 12/1995 | Japan . | |

*Primary Examiner*—Jeffery R. Thurlow
*Attorney, Agent, or Firm*—Frishauf, Holtz, Goodman, Langer & Chick, P.C.

[57] ABSTRACT

The invention relates to a method for surface treatment of a weather strip, by which a surface appearance almost identical to an embossing process is obtained in a simplified way without requiring any post-treatment by, for example, an embossing roll, wherein a thin film compressed and deformed by causing thermoplastic resin powder grains 5, which are mixed with thermoplastic base resin 4 and are not completely melted at an extrusion molding temperature, to pass through a flow path 6 of die 1, is extrusion-molded on the surface of glass run 2, and the thin film portion is applied as a sliding plane 3 for door glass.

11 Claims, 1 Drawing Sheet

5 THE POWDER GRAINS
4 THE THERMOPLASTIC BASE RESIN

OUTSIDE-ROOM

INSIDE-ROOM

METHOD FOR SURFACE TREATMENT OF WEATHER STRIP

FIELD OF THE INVENTION

The present invention relates to a method for surface treatment of a vehicle's weather strip for, for example, a glass run by extrusion molding.

BACKGROUND OF THE INVENTION

There are cases where some decorations are applied on the surface of weather strips of vehicles. For example, as shown in FIG. 4, generally, since a lustrous surface appearance is not preferred due to spoiling a sense of superior quality on the lip sliding planes 17, 18 with door glass, which is elevated and lowered, of a glass run 10 internally attached to a door sash 20, there are some cases where embossing, etc. is given as a method for suppressing the luster thereof. Furthermore, the glass run 10 is a glass run, the cross-section of which is roughly channel-shaped, consisting of a base portion 11, an inside-room side wall 12, an outside-room side wall 13, an inside-room lip 14, and an outside-room lip 15, and a base portion sliding plane 16, a lip sliding plane 17, and a lip sliding plane 18 are respectively formed on the base portion 11, inside-room lip 14, and outside-room lip 15.

The embossing is carried out in such a manner that a sliding plane extrusion-molded on the surface of a glass run in advance is embossed by causing the same to pass through an embossing roll, the roller surface of which is embossed, or by pneumatically spraying glass pieces thereto.

However, in a case of embossing a curved portion by using an embossing roll, there is such a problem that even embossing is not performed since the embossing is not carried out uniformly. Furthermore, in a case where the shape is complicated, it is very expensive since a plurality of embossing rolls are needed. And if the surface to be embossed is still more complicated, the embossing itself is made impossible. Furthermore, in a case where embossing is carried out by pneumatically spraying, for example, glass pieces, unevenness is produced if the surface is completed, and since an air gun or air supply device is necessary, the embossing cost is increased.

Since the embossing is a treatment to be performed after the sliding plane is extrusion-molded as described above, there is such a problem that a production line or space exclusive for the embossing becomes necessary.

Therefore, it is an object of the invention to provide a method for surface treatment of weather strips, which is able to obtain a surface appearance very close to an embossing in a simplified way without carrying out any post-treatment by, for example, an embossing roll.

SUMMARY OF THE INVENTION

In order to achieve the above objects, a method for surface treatment of weather strips according to the invention is characterized in that a thin film consisting of compression-deformed powder grains of thermoplastic resin, which are mixed with thermoplastic base resin and not completely melted at the extrusion-molding temperature, is extrusion-molded on the surface of weather strip, and said thin film is extrusion-molded simultaneously at the die for extrusion molding of the weather strip.

Furthermore, said weather strip is a glass run internally mounted on a door sash, and it is preferable that a thin film formed on the surface is applied as a sliding plane for the door glass.

Still furthermore, it is preferable that the compressing deformation of said powder grains are executed by causing base resin, with which said powder is mixed, to pass through a flow path for which the flow path diameter of said die attached to the tip end portion of an extrusion molder is made smaller at the tip end part thereof than that at the rear end part thereof.

According to the invention, since thermoplastic resin powder mixed with the thermoplastic base resin is not completely melted at an extrusion molding temperature, it may leave as being separate in the base resin. Since a thin film obtained by compressing deformation of the thermoplastic resin is formed by extrusion molding on the surface of a weather strip, powder, the cross-section of which is roughly circular, is temporarily deformed and strained to be roughly elliptical at the cross-section thereof and extruded. Thereafter, as the strain of the deformed powder grains is gradually released naturally and they return to their original shape, the surface of the thin film between adjacent powder grains is made uneven, whereby a surface appearance almost identical to a uniform embossing is able to be obtained.

Furthermore, since a single die is used for extrusion molding of weather strips and extrusion molding of a thin film at the same time, the working efficiency is much increased.

The point of thermoplastic resin powder grains not being completely melted refers to that a few powder grains remain as they are and keep their shape. As shown in FIG. 3A, it is needless to say that a case where thermoplastic resin powder grains are not melted at all is included, and further it may include a state where, for example, as shown in FIG. 3B, the outer surface thereof is melted a little, and a state where, as shown in FIG. 3C, the outer surface is considerably melted.

Preferably, as in an embodiment of the invention since the weather strip is used as a glass run internally fitted to a door sash and a thin film formed on the surface is applied to a sliding surface of door glass, for example, to a lip sliding surface, a surface appearance almost identical to an embossing process is able to be obtained, thereby a sense of superior quality is established.

Furthermore, according to a further embodiment of the invention, compressing deformation of plastic resin powder grains is easily carried out by causing base resin, with which plastic powder grains are mixed, to pass only through a flow path, for example, formed to be tapered, with the flow path diameter of a die attached to the tip end of an extrusion molder made smaller at the rear end part than that at the tip end part.

It is therefore an object of the invention to simplify the process of surface treatment of weather strips since a surface appearance almost identical to a uniform embossing is able to be obtained by only forming by an extrusion molding process a thin film, which is obtained by causing thermoplastic resin powder grains mixed with thermoplastic base resin to be compression-deformed.

Another object of the invention is to decrease the production cost of weather strips to a large extent since at this time no embossing roll is used, or no post-treatment such as air spraying is required, to save the production site space since no additional equipment is used, and to secure a better working efficiency since a single die is used for both extrusion molding of weather strips and that of thin films.

Still another object of the invention is to obtain a surface appearance almost identical to an embossing process since a surface treated weather strip is used as a glass run internally fitted to a door sash, and a thin film formed on the surface thereof is applied to the sliding plane of door glass, whereby a sense of superior quality is enjoyed.

A further object of the invention is to provide a method for surface treatment of weather strips, by which it is possible to compress and deform powder grains by causing only base resin, with which powder grains are mixed, to pass through a flow path attached to the die. Therefore no complicated equipment is needed. This is advantageous in view of the production cost thereof.

BRIEF DESCRIPTION OF THE DRAWINGS

Other advantages of the invention will be readily appreciated as the same becomes better understood by reference to the following detailed description when considered in connection with the accompanying drawings wherein.

DESCRIPTION OF A PREFERRED EMBODIMENT

Figure 1:
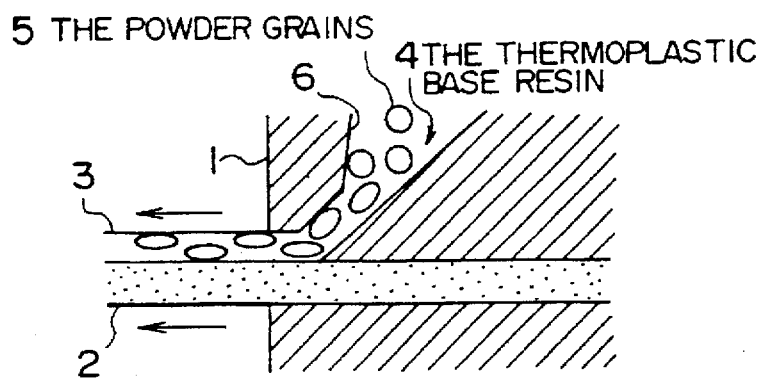
FIG. 1 is a cross-sectional view showing a part of a die used in a method for surface treatment of weather strips, according to a preferred embodiment of the invention.

A preferred embodiment of the invention will be described below with reference to the drawings attached herewith. FIG. 1 is a cross-sectional view showing a part of a die for which a method for surface treatment of weather strips is used, according to a preferred embodiment of the invention. The weather strip is applied to a glass run 2 made of solid rubber, which is internally fitted to a door sash, and the preferred embodiment of the invention shows a method for molding and processing a sliding plane 3, which is caused to slide together with and is brought into contact with door glass which is elevated and lowered, on the surface of glass run 2.

A die 1 is attached to the tip end of an extrusion molder (not illustrated), whereby a glass run 2 which is extruded in the horizontal direction and a sliding plane 3 relative to the surface of the glass run 2 are extruded in a composite manner.

The sliding plane 3 is formed by extrusion molding a thin film obtained by compressing deformation of thermoplastic resin powder grains 5 which are mixed with thermoplastic base resin 4 and are not completely melted at an extrusion molding temperature, onto the surface of the glass run 2. The compressing deformation of powder grains 5 is carried out by causing base resin 4, with which powder grains 5 are mixed, to pass through a flow path 6 formed, for example, to be tapered, with the flow path diameter of the die 1 made smaller at the tip end side communicating with the surface of the glass run 2 than that at the rear end side.

Figure 2:
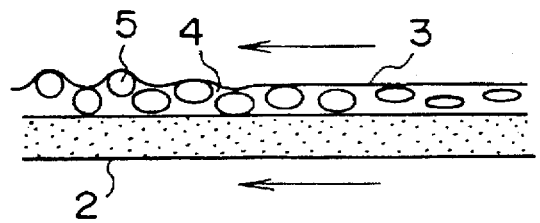
FIG. 2 is a cross-sectional view showing a state where the surface of sliding plane 3 is made uneven.
Figure 3A:
FIG. 3A is a view showing the state of powder grains 5, wherein the powder grains are not melted at all.
Figure 3B:
FIG. 3B is a view showing a state where the outer surface is melted a little.
Figure 3C:
FIG. 3C is a view showing a state where the outer surface is considerably melted.

Thereby, since the powder grains 5 do not reach the melting state suitable for extrusion molding, as shown in FIG. 1, they are temporarily deformed and strained from a roughly circular shape at the cross-section thereof to a roughly elliptical shape at the cross-section thereof when they are extruded. Thereafter, the strain of the powder grains 5 deformed as shown in FIG. 2 is gradually released naturally, and the powder grains 5 return to their original shape, whereby the surface of the sliding plane 3 is made uneven, and a surface appearance almost identical to an embossing process is able to be obtained.

It is possible to control the surface state of sliding plane 3 by varying the material, grain size and mixing ratio of thermoplastic resin powder grains 5. For example, in a case where crosslinking polyethylene (for example, Brand name "LinkIon" of Mitsubishi Chemical) is used as thermoplastic base resin 4, ultra-high-molecular-weight polyethylene (for example, Brand name "Hizexmillion" of Mitsui Petro-Chemical) is used as thermoplastic resin powder grains 5, the mixing ratio of crosslinking polyethylene and ultra-high-molecular-weight polyethylene is 100:10 (10PHR), and the extrusion molding temperature is set to about 200 degrees in centigrade, a surface appearance almost identical to an embossing process could be obtained. In addition thereto, it was possible to obtain a sliding plane 3 of low sliding resistance and superior wear resistance by a high sliding property of ultra-high-molecular-weight polyethylene, wherein ultra-high-molecular-weight polyethylene means high density polyethylene, the average molecular weight of which is 1,000,000 or more.

The thermoplastic base resin 4 is not limited to crosslinking polyethylene. The thermoplastic resin powder grains 5 are not limited to a ultra-high-molecule-weight polyethylene. Any kind of polyethylene which is not completely melted at an extrusion molding temperature may be available. Thereby, if the polyethylene is the same kind, a kind of polyethylene which is completely melted at an extrusion molding temperature due to a difference of the grade thereof may be used as thermoplastic base resin 4, and another kind of polyethylene which is not completely melted at the same temperature may be used as thermoplastic resin powder grains 5.

Figure 4:
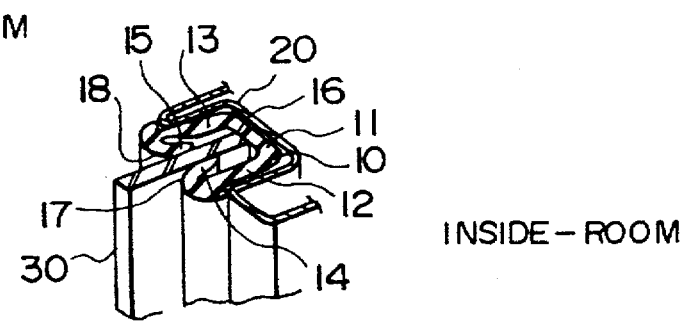
FIG. 4 is a perspective view showing a state where a generally channel-shaped glass run 10 is attached to a door sash 20 and door glass 30 is inserted therein.

The sliding plane 3 formed above may be used as lip sliding planes 17, 18 shown in FIG. 4, utilizing a surface appearance having a sense of superior quality. Furthermore, since the sliding plane 3 has a high sliding property, it may be used as a base sliding plane 16.

In the preferred embodiment of the invention, although the glass run 2 and sliding plane 3 are extrusion-molded by a composite extrusion molding process, it is needless to say that a sliding plane 3 may be extrusion-molded on the glass run 2 which is formed in advance by extrusion molding. Furthermore, the above preferred embodiment shows a case where a weather strip to which a surface treatment is given is applied to a glass run 2. The application thereof is not limited to this case, but to various places, for example, a waist sealing portion, etc.

What is claimed is:

1. A method for preparing a weather strip material having a sliding surface, comprising:

(a) providing a die comprising:
(i) a tapered first path having an entrance opening and an exit opening, the exit opening being smaller than the entrance opening, and
(ii) a second flow path which intersects with the exit opening of the first path;

(b) feeding a weather strip base material through the second flow path;

(c) feeding to the entrance opening of the first flow path a thermoplastic base resin and powder grains of a thermoplastic resin to form a mixture; and (d) passing the mixture from step (c) through the first flow path at a temperature such that the powder grains of the thermoplastic resin are not completely melted and forming a layer of the thermoplastic base resin with the powder grains therein, on the weather strip base material, wherein the powder grains are compressed and temporarily deformed at an outlet of the die and wherein after exiting from the die, the powder grains retain their original shape to form an uneven sliding surface on the weather strip material.

2. The method of claim 1, wherein the powder grains of the thermoplastic resin consist essentially of polyethylene having a molecular weight of 1,000,000 or more.

3. The method of claim 1, wherein the thermoplastic base resin consists essentially of crosslinked polyethylene.

4. The method of claim 1, wherein the weather strip base material is made of rubber.

5. The method of claim 4, wherein the mixture consists essentially of powder grains of polyethylene having a molecular weight of 1,000,000 or more and crosslinked polyethylene as the thermoplastic base resin.

6. The method of claim 5, wherein the crosslinked polyethylene and the polyethylene having a molecular weight of 1,000,000 or more are contained in a ratio of 100:10.

7. The method of claim 6, wherein the temperature is 200° C.

8. The method of claim 1, wherein the powder grains in step (a) have a substantially circular cross-sectional shape and the powder grains after being deformed in step (d) have a substantially elliptical cross-sectional shape.

9. The method of claim 5, wherein the rubber is extruded and the mixture is extruded.

10. A method of producing a weather strip comprising preparing a weather strip material having a sliding surface according to claim 1 and mounting the weather strip material having a sliding surface on a door sash having a glass pane such that the sliding surface is in contact with the glass pane.

11. The method of claim 10, wherein the weather strip material having a sliding surface is substantially in the shape of a channel.

* * * * *